US010364755B2

(12) United States Patent
Muramatsu (10) Patent No.: US 10,364,755 B2
(45) Date of Patent: Jul. 30, 2019

(54) EXHAUST CONTROL DEVICE FOR ENGINE (71) Applicant: SUZUKI MOTOR CORPORATION, Hamamatsu-Shi, Shizuoka (JP)

(72) Inventor: Takayoshi Muramatsu, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 266 days.

(21) Appl. No.: 15/284,633

(22) Filed: Oct. 4, 2016

(65) Prior Publication Data
US 2017/0101939 A1 Apr. 13, 2017

(30) Foreign Application Priority Data

Oct. 13, 2015 (JP) .................................. 2015-202230

(51) Int. Cl.
*F02D 9/04* (2006.01)
*F02B 61/02* (2006.01)
(Continued)

(52) U.S. Cl.
CPC .............. *F02D 9/04* (2013.01); *B62K 11/02* (2013.01); *F01N 13/04* (2013.01); *F01N 13/08* (2013.01);
(Continued)

(58) Field of Classification Search
CPC ......... B62K 11/02; F01N 13/04; F01N 13/08; F01N 2240/36; F01N 2470/16;
(Continued)

(56) References Cited

U.S. PATENT DOCUMENTS 3,824,788 A * 7/1974 Cole ..................... F01N 3/2006
422/171
4,840,029 A * 6/1989 Sakurai ................... F02B 27/06
60/313
(Continued)

FOREIGN PATENT DOCUMENTS

| JP | 2-64216 A | 3/1990 |
| JP | 4587371 B2 | 11/2010 |
| JP | 2013-167176 A | 8/2013 |

OTHER PUBLICATIONS

Notification of Reasons for Refusal issued in corresponding Japanese Patent Application No. 2015-202230 dated Apr. 9, 2019 (with machine translation).

Primary Examiner — Thai Ba Trieu
Assistant Examiner — Diem T Tran
(74) Attorney, Agent, or Firm — Troutman Sanders LLP (57) ABSTRACT An exhaust control device for engine configures an exhaust system by joining exhaust pipes at a collecting pipe. The exhaust pipes are coupled to a plurality of respective cylinders. At least two types of exhaust valves are configured to perform an exhaust control at different parts in the exhaust system. The exhaust control device for engine includes first exhaust valves, a second exhaust valve, and an actuator. The first exhaust valves are mounted to a plurality of communicating pipes and communicating the predetermined exhaust pipes. The second exhaust valve is mounted to the collecting pipe. The actuator is configured to drive to open and close the second exhaust valve. The first exhaust valves are configured to be driven to open and close corresponding to an actuating region of the second exhaust valve.

7 Claims, 9 Drawing Sheets (51) Int. Cl.
*B62K 11/02* (2006.01)
*F01N 13/04* (2010.01)
*F01N 13/08* (2010.01)
*F02B 27/06* (2006.01)

(52) U.S. Cl.
CPC .............. *F02B 27/06* (2013.01); *F02B 61/02* (2013.01); *F01N 2240/36* (2013.01); *F01N 2470/16* (2013.01); *F01N 2590/04* (2013.01); *Y02T 10/146* (2013.01)

(58) Field of Classification Search
CPC ...... F01N 2590/04; F02B 27/06; F02B 61/02; F02D 9/04; Y02T 10/146
USPC ................................................... 60/312, 313
See application file for complete search history.

(56) References Cited

U.S. PATENT DOCUMENTS

| | | | |
|---|---|---|---|
| 5,582,002 A * | 12/1996 | Pattas | ..................... F01N 3/023 60/274 |
| 7,703,574 B2 * | 4/2010 | Kruger | ................... F01N 13/02 181/253 |
| 2001/0035009 A1 * | 11/2001 | Nakayasu | ................. F01N 3/28 60/324 |
| 2013/0205760 A1 * | 8/2013 | Sasaki | ..................... F01N 13/08 60/324 |

* cited by examiner

EXHAUST CONTROL DEVICE FOR ENGINE

CROSS-REFERENCE TO RELATED APPLICATIONS

This application is based upon and claims the benefit of priority of the prior Japanese Patent Application No. 2015-202230, filed on Oct. 13, 2015, the entire contents of which are incorporated herein by reference.

BACKGROUND OF THE INVENTION

Field of the Invention

The present invention relates to an exhaust control device that performs an exhaust control on an exhaust pipe in an engine mounted to a motorcycle or a similar vehicle.

Description of the Related Art

A vehicle such as a motorcycle includes an exhaust control device that includes an exhaust valve in the middle of an exhaust pipe. Opening and closing an exhaust passage improve exhaust efficiency. Specifically, for example, the exhaust pipe includes two exhaust valves actuated in different rotation speed regions of an engine. With the two exhaust valves, an electronically controlled actuator drives the respective exhaust valves. This allows further appropriate control of the two exhaust valves according to the engine rotation speed.

For example, Japanese Patent No. 4587371 discloses an exhaust control device that performs an open/close driving control on two types of exhaust valves by a single actuator.

However, this exhaust control device actuates the two exhaust valves of different actuating regions by the one actuator. This complicates a configuration of the actuator such as a pulley and a positioning unit. This has no choice but to increase the number of components and the weight, and these factors affected productivity. This also made it difficult to precisely manage the actuating regions by the actuator.

SUMMARY OF THE INVENTION

The present invention has been made under these circumstances, and its objective is to provide an exhaust control device for engine that achieves an appropriate exhaust control with good efficiency with a simple configuration.

An exhaust control device for engine according to the present invention configures an exhaust system by joining exhaust pipes at a collecting pipe. The exhaust pipes are coupled to a plurality of respective cylinders. At least two types of exhaust valves are configured to perform an exhaust control at different parts in the exhaust system. The exhaust control device for engine includes first exhaust valves, a second exhaust valve, and an actuator. The first exhaust valves are mounted to a plurality of communicating pipes and communicating the predetermined exhaust pipes. The second exhaust valve is mounted to the collecting pipe. The actuator is configured to drive to open and close the second exhaust valve. The first exhaust valves are configured to be driven to open and close corresponding to an actuating region of the second exhaust valve.

The exhaust control device for engine of the present invention further includes a second exhaust valve lever and a first exhaust valve lever. The second exhaust valve lever and first exhaust valve lever are disposed coaxially with the second exhaust valve. The second exhaust valve lever is configured to be actuated synchronously with the second exhaust valve. The first exhaust valve lever is configured to actuate the first exhaust valves. The actuator is configured to actuate the second exhaust valve lever. The second exhaust valve lever is configured to actuate the first exhaust valve lever.

The exhaust control device for engine of the present invention is configured as follows. The second exhaust valve lever is brought into abutment with the first exhaust valve lever. Afterwards the second exhaust valve lever is brought into abutment with a stopper disposed at the collecting pipe.

The exhaust control device for engine of the present invention is configured as follows. The first exhaust valve lever is rotatively and axially supported to a rotation shaft. The rotation shaft concentrically supports the second exhaust valve lever.

The exhaust control device for engine of the present invention further includes an engaging piece. The engaging piece is disposed as a part of the first exhaust valve lever. The engaging piece ensures an abutment with the second exhaust valve lever. Rotation of the second exhaust valve lever at a predetermined angle to be brought into abutment with the engaging piece so as to push and move the engaging piece actuates the first exhaust valve lever to rotate.

The exhaust control device for engine of the present invention is configured as follows. From a low rotation to a medium rotation of the engine, the second exhaust valve opens from a predetermined degree of opening up to equal to or more than half degree of opening while the first exhaust valves are fully closed. At a high rotation of the engine, the first exhaust valves is configured to open up to a full opening from a full closing and the second exhaust valve is also configured to open up to a full opening.

The exhaust control device for engine of the present invention is configured as follows. The first exhaust valves, the second exhaust valve, and the actuator are arranged sequentially from a front to a rear of a vehicle.

The exhaust control device for engine of the present invention is configured as follows. The actuator is installed in a predetermined manner inside seat rails at a lower side of a seat.

DETAILED DESCRIPTION OF THE PREFERRED EMBODIMENTS

Figure 1:
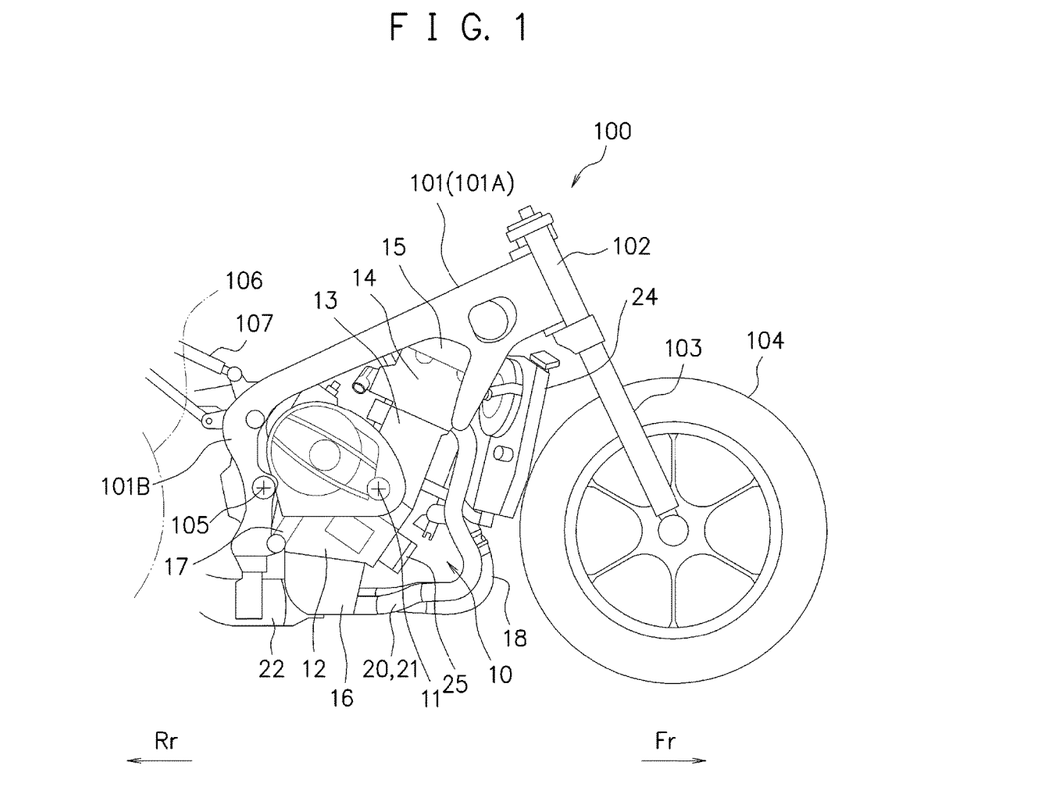
FIG. 1 is a side view illustrating an exemplary configuration of main parts of a motorcycle according to an embodiment of the present invention.
Figure 2:
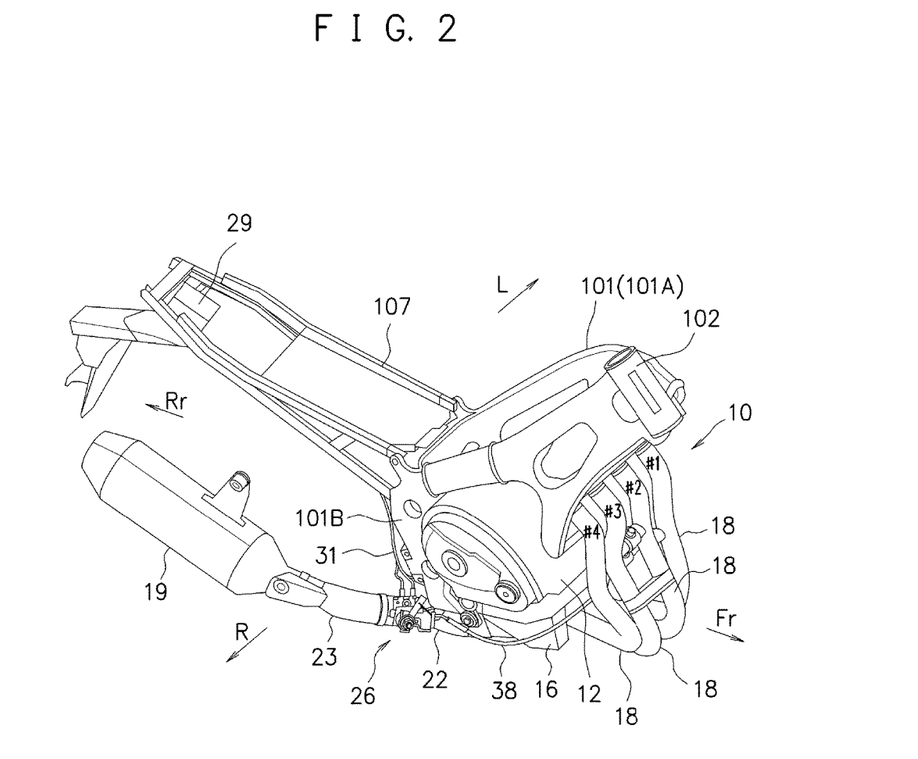
FIG. 2 is a perspective view illustrating a surrounding of an engine mounted to a vehicle body according to the embodiment of the present invention.

The following describes preferable embodiments of an exhaust control device for engine according to the present invention with reference to the drawings. FIG. 1 is a side view illustrating an exemplary configuration of main parts of a motorcycle 100 as an application example of the present invention. FIG. 2 is a perspective view illustrating a surrounding of an engine mounted to a vehicle body. First, the following describes configurations of the main parts of the motorcycle 100 with reference to FIG. 1 and FIG. 2; however, FIG. 1 and FIG. 2 omit illustrations of some parts. In the drawings including FIG. 1 used in the following description, as necessary, the front side of the vehicle is indicated by an arrow Fr and the rear side of the vehicle is indicated by an arrow Rr. The lateral right side of the vehicle is indicated by an arrow R and the lateral left side of the vehicle is indicated by an arrow L.

In FIG. 1 and FIG. 2, the motorcycle 100 has a vehicle body frame 101 made of steel or aluminum alloy material, and this vehicle body frame 101 supports configuration members including an engine or components. In the front portion of the vehicle body frame 101, two right and left front forks 103 are disposed. The front forks 103 are supported by a steering head pipe 102 turnably to the right and left. To the upper end of the front forks 103, a handlebar is secured via a steering bracket. In the lower portion of the front forks 103, a front wheel 104 is rotatably supported and a front fender is mounted to cover the upper portion of the front wheel 104.

The vehicle body frame 101 is joined integrally to the rear portion of the steering head pipe 102 and branches into a right and left pair of two portions rearward. The vehicle body frame 101 is constituted of a main frame 101A, which extend from the steering head pipe 102 while widening in the rear downward direction, and pivot frames 101B, which are welded to the main frame 101A and extend in the rear downward direction, as what is called a twin-spar frame. The main frame 101A and the pivot frames 101B are joined together, and have a three-dimensional structure where a space is formed inside as a whole. Inside the space, an engine 10 is mounted to the vehicle body frame 101.

In the middle of the pivot frame 101B of the vehicle body frame 101 in the above-below direction, a swing arm is combined swingably via a pivot shaft 105 in the above-below direction. To the rear end of the swing arm, a rear wheel 106 (partially abbreviated by two-dot chain line) is rotatably supported. Between the vehicle body frame 101 and the swing arm, a rear shock absorber is installed in a predetermined manner. Specifically, the lower end side of the rear shock absorber is coupled to both the vehicle body frame 101 and the swing arm via a link mechanism. To the rear wheel 106, a driven sprocket is axially supported. A power transmission chain is wound around between a drive sprocket on the engine 10 side and the driven sprocket of the rear wheel 106. The engine power is transmitted from the drive sprocket to the driven sprocket via the chain. This rotatably drives the rear wheel 106. In the closest vicinity of the rear wheel 106, a rear fender is disposed. The rear fender covers the vicinity of the front upper portion of the rear wheel 106.

From the vicinity of the rear portion of the vehicle body frame 101 to the upper side of the rear wheel 106, a seat rail 107 extends rearward while being appropriately inclined to rear upward. This seat rail 107 supports a seat (sitting seat). On the front side of the seat, a fuel tank covered with a tank cover is mounted.

In the vehicle exterior, the front portion and both right and left side portions of the vehicle are mainly covered with respective cowlings (hereinafter referred to simply as cowls). In this example, an upper cowl, a body cowl, an under cowl, and a similar member may integrally cover a surrounding of the vehicle front portion, and side cowls may cover both the vehicle side portions. In the vehicle rear portion, a seat cowl covers and surrounds the seal.

Approximately in the vehicle center of the motorcycle 100, as illustrated in FIG. 1 and FIG. 2, the engine 10 is mounted to and supported by the vehicle body frame 101. The engine 10 in this embodiment employs a water-cooled multicylinder four-cycle gasoline engine. The engine 10 is a parallel multi-cylinder engine where cylinders are arranged side by side in the right-left direction (the vehicle-width direction). Specifically, the engine 10 is a parallel four-cylinder engine and cylinders #1 to #4 (note that the following simply describes the cylinders #1 to #4 as "#1" and similar expressions) are collocated from the left in the right-left direction. Over a crankcase 12, which houses a crankshaft 11, horizontally supported in the right-left direction, a cylinder block 13, a cylinder head 14, and a cylinder head cover 15 are integrally joined to be sequentially stacked. Under the crankcase 12, an oil pan 16 is attached. Here, a cylinder axis of the engine 10 is arranged to be appropriately inclined forward. This engine 10 is suspended via a plurality of engine mounts (engine suspending portions) to be integrally combined and supported on the inside of the vehicle body frame 101, and itself acts as a rigid member of the vehicle body frame 101.

In the rear portion of the crankcase 12, a transmission case 17 is integrally formed. Inside this transmission case 17, a countershaft and a plurality of transmission gears, which will be described later, are arranged. The power of the engine 10 is transmitted from the crankshaft 11 through the transmission and finally to the drive sprocket, which is an output end of the engine 10. This drive sprocket rotatably drives the rear wheel 106 (in FIG. 1) via the power transmission chain as described above.

The crankcase 12 and the transmission case 17 are integrally combined together, and wholly constitute a casing assembly of an engine unit including the engine 10. In the appropriate positions in this casing assembly, a plurality of auxiliary machines including a starter motor for starting the engine, a clutch device, and a similar member are mounted or combined. The entire engine unit including these members is supported by the vehicle body frame 101.

To the engine 10, additionally, an intake system, an exhaust system, a cooling system, a lubricating system, and a control system (ECU: Engine Control Unit) are attached. The intake system supplies air-fuel mixture containing air (intake air) and fuel supplied from an air cleaner and a fuel supply device, respectively. The exhaust system discharges burnt exhaust gas from the engine 10. The cooling system cools the engine 10. The lubricating system lubricates movable parts of the engine 10. The control system controls the operations of these systems. The control by the control system causes the plurality of functional systems to collaborate with the above-described auxiliary machines and a similar member so as to perform a smooth actuation as the entire engine unit.

The respective functional systems will be described. Firstly, in the intake system, each cylinder has an intake port opened on the rear side of the cylinder head 14, and this air intake opening couples to a throttle body via an intake pipe. The throttle body is mounted with a throttle valve that opens and closes an intake passage or a passage formed inside the throttle body corresponding to the accelerator position so as to control the flow rate of the air supplied from the air cleaner. In this example, the throttle valve axes of the respective cylinders are coaxially arranged. These throttle valve axes are mechanically, electrically, or electromagnetically driven by a valve driving mechanism.

On the other hand, the respective throttle bodies include injectors for fuel injection arranged in the downstream of the throttle valves. To these injectors, the fuel in the fuel tank is supplied by a fuel pump. In this case, each injector is coupled to, in its upper side, a delivery pipe laterally bridged in the vehicle-width direction. The fuel is delivered from a delivery pipe coupled to the fuel pump. Each injector injects the fuel to the intake passage inside the throttle body at a predetermined timing by the control by the above-described control system. This supplies air-fuel mixture at a predetermined air-fuel ratio to the cylinder blocks 13 of the respective cylinders.

Next, in the exhaust system, each cylinder has an exhaust port opened on the front side of the cylinder head 14, and this exhaust opening couples to an exhaust pipe 18. The exhaust pipes 18 of the respective cylinders once extend downward from the exhaust openings, and are joined to be integrated in the lower side of the crankcase 12. The exhaust pipe 18 extends rearward, and a muffler 19 is mounted on the rear end of the exhaust pipe 18.

Figure 3:
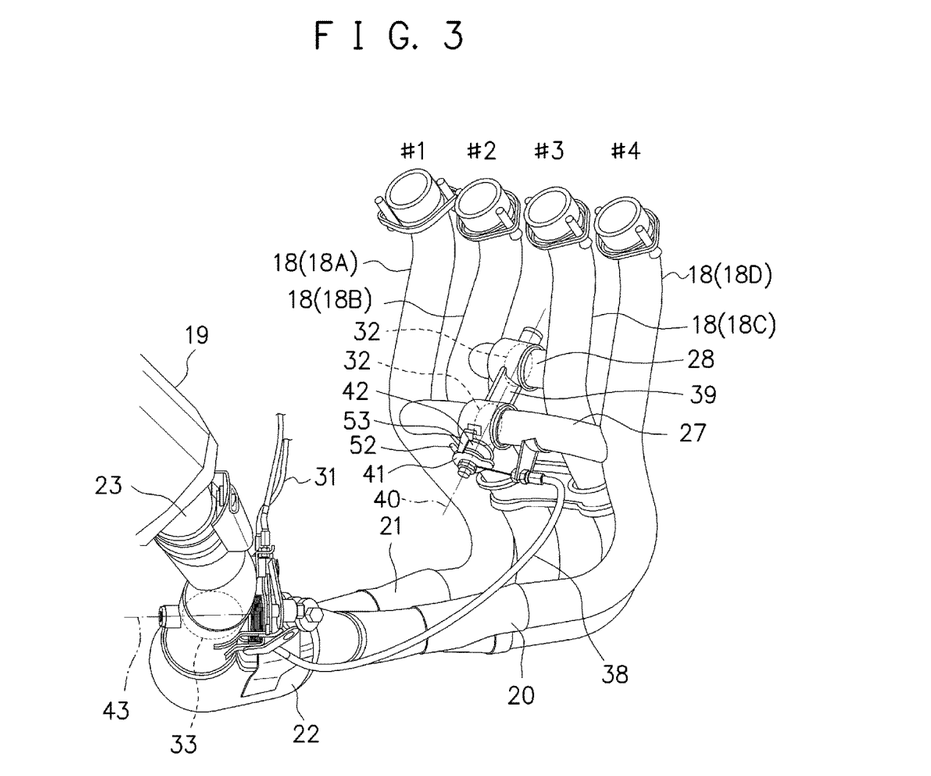
FIG. 3 is a perspective view illustrating a surrounding of an exhaust system that includes an exhaust control device according to the embodiment of the present invention.

In this case, with reference to FIG. 3, the exhaust pipe 18 at the cylinder #1 joins the exhaust pipe 18 at the cylinder #2 at a joining portion 20, and the exhaust pipe 18 at the cylinder #3 joins the exhaust pipe 18 at the cylinder #4 at a joining portion 21. Further, the mutual joining of the joining portion 20 with the joining portion 21 collects the four exhaust pipes 18 at the cylinders #1 to #4 to a single collecting pipe 22 at an approximately left downward of the oil pan 16. The collecting pipe 22 is coupled to the muffler 19 via a coupling pipe 23.

In the cooling system, at the peripheral area of the cylinder block 13 and the cylinder head 14, a water jacket, which is formed to circulate cooling water, is constituted. A radiator 24, which is a heat exchanger cooling the cooling water supplied to this water jacket, is equipped. Blowing travelling air by the radiator 24 dissipates heat of the cooling water passing through the inside. In this example, the radiator 24 has an approximately laterally-long rectangular (rectangular) shape in a front view. As illustrated in FIG. 1, the radiator 24 is arranged extending while being appropriately inclined rearward from the vicinity of the lower portions of the steering head pipes 102 to the vicinity of the front sides of the exhaust pipes 18 on the front of the cylinder block 13. The cylinder block 13 of the engine 10 is approximately covered with the radiator 24 in a front view.

Here, the radiator 24 is supported using the vehicle body frame 101 and a similar member in an appropriate position.

The cooling system of this example includes a water pump at the left side wall portion of the crankcase 12. The water pump is coordinately driven with an oil pump, for example, built into the crankcase 12. This water pump and the water jacket are mutually coupled with a cooling water hose. The water pump and the radiator 24 are mutually coupled with another cooling water hose. The cooling water cooled by the radiator 24 is supplied to the water pump via the cooling water hose. The water pump discharges the cooling water cooled by the radiator 24 and causes the cooling water to pass through inside the water jacket, thus cooling the engine. The cooling water passing through inside the water jacket is supplied to the radiator 24 via the cooling water hose. The radiator 24 cools the cooling water supplied from the engine 10 and supplies the water pump with the cooling water via the cooling water hose again, thus repeating the cooling water circulation in the cooling system.

Further, the lubricating system is constituted to supply lubricating oil to the movable parts of the engine unit to lubricate these movable parts. This lubricating system includes valve gears, which are constituted around the crankshaft 11 and inside the cylinder head 14, a cam chain, which couples these valve gears, the transmission, and a similar member. In this embodiment, for the lubricating system, an oil pump driven using a rotational force of the crankshaft 11 directly or indirectly as a driving source is built into the crankcase 12. A trochoid pump or a similar pump is used as the oil pump. This oil pump supplies the lubricating oil absorbed up from the oil pan 16 to the lubricating system. An oil filter 25 is mounted to the lower portion on the front side of the crankcase 12. Before the lubricating oil is supplied to the lubricating system, the oil filter 25 purifies the lubricating oil.

As described above, the exhaust system from the exhaust pipes 18 (18A to 18D) through the joining portion 20 and the joining portion 21 to the muffler 19 from the collecting pipe 22 via the coupling pipe 23 is configured. To perform the exhaust control on this exhaust system, although FIG. 2 omits the illustration, an exhaust control device 26 is disposed. With the present invention, the exhaust control device 26 includes at least two types of exhaust valves that perform the exhaust control at different parts in the exhaust system. A single actuator or actuator unit drives to open and close these exhaust valves.

The following specifically describes the exhaust control device 26 according to the present invention. As illustrated in FIG. 3, in the exhaust system, the exhaust pipes 18 (18A, and 18D), which are at both right and left ends of the cylinders #1 and #4, are mutually communicated via a communicating pipe 27. This communicating pipe 27 is horizontally bridged across rear sides of the exhaust pipes 18 at both right and left ends. The exhaust pipes 18 (18B and 18C) at the cylinders #2 and #3 are mutually communicated via a communicating pipe 28. This communicating pipe 28 is bridged across between the exhaust pipes 18 at the cylinders #2 and #3. The communicating pipe 28 is positioned appropriately obliquely upward to the front with respect to the communicating pipe 27. As described later, to the communicating pipe 27 and the communicating pipe 28, exhaust valves of the exhaust control device 26 according to the present invention are mounted.

Figure 4A:
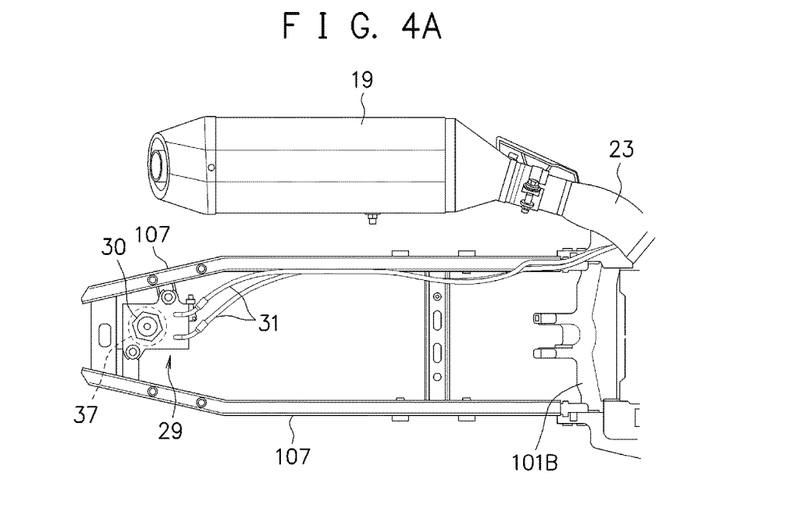
FIG. 4A is a bottom view illustrating amounting support structure of an actuator unit according to the embodiment of the present invention.

With this embodiment, parts to which the present invention is applied are the exhaust pipes 18 and the collecting pipe 22. Although the illustration is abbreviated in FIG. 2, this embodiment includes an actuator unit 29 that performs the exhaust control on these parts. In this example, as illustrated in FIG. 4A, the actuator unit 29 is positioned at a lower side of the seat and is mounted and supported using the seat rails 107. The actuator unit 29 mounted to the inner rear end portion of the pair of seat rails 107 includes a drive unit 30. This drive unit 30 drives the exhaust valves, controlled targets coupled via a pair of wires or cables 31. With reference to FIG. 3, as the controlled targets, exhaust valves 32 (first exhaust valves) and an exhaust valve 33 (a second exhaust valve) are disposed. The exhaust valves 32 are mounted to the communicating pipe 27 and the communicating pipe 28 to open and close the communicating pipe 27 and the communicating pipe 28. The exhaust valve 33 is mounted to the collecting pipe 22 to open and close the collecting pipe 22. FIG. 3 omits the detailed illustrations of the exhaust valves 32 and the exhaust valve 33 themselves. Rotatably driving the exhaust valves 32 can perform the open/close control on the communicating pipe 27 and the communicating pipe 28. Rotatably driving the exhaust valve 33 can perform the open/close control on the collecting pipe 22.

Figure 4B:
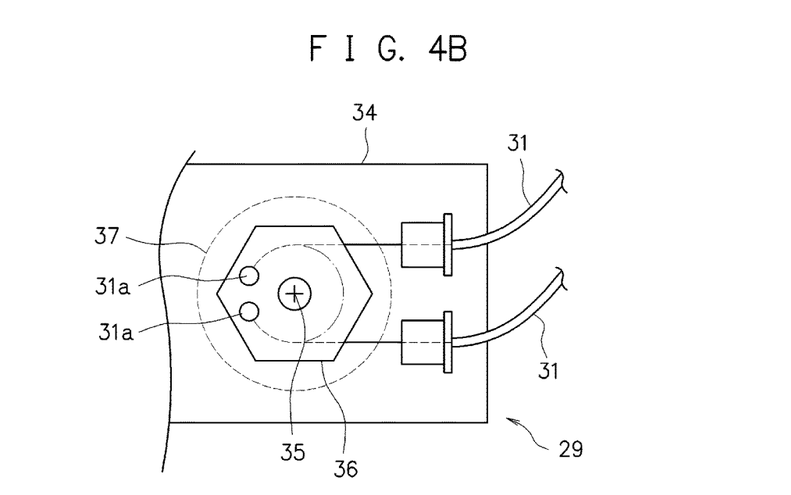
FIG. 4B is a plan view illustrating an exemplary configuration of the actuator unit according to the embodiment of the present invention.

Further, the following specifically describes the actuator unit 29. FIG. 4B is a bottom view of the actuator unit 29. A rotary drive shaft 35 of the drive unit 30 projects from the lower surface of a casing 34. A drive pulley 36 is axially supported at a distal end of the rotary drive shaft 35. At the drive pulley 36, a guide groove (not illustrated) around which the wires 31 are wound is formed. The pair of wires 31 are wound around the rotary drive shaft 35 so as to surround the rotary drive shaft 35 at both sides. Terminals 31a on one sides of the wires 31 are held to locking holes (not illustrated) on the drive pulley 36. The casing 34 incorporates, for example, a stepping motor 37, a driving source for the rotary drive shaft 35 of the actuator unit 29. The actuation of this stepping motor 37 rotatably drives the drive pulley 36 at predetermined timing, direction, and amount (angle). This rolls up or unreels one of the pair of wires 31 and unreels or rolls up the other.

As described above, the exhaust valves 32 are mounted to the respective communicating pipe 27 and communicating pipe 28, and the exhaust valve 33 is mounted to the collecting pipe 22. As also illustrated in FIG. 4A, the wires 31 coupled to the actuator unit 29 are routed along the seat rail 107 (the right side) and are extended up to the parts where the exhaust valve 33 is disposed. Between the arranged part of the exhaust valve 33 and arranged parts of the exhaust valves 32 is coupled via a wire or cable 38.

First, the following describes the exhaust valve 32 side. As illustrated in FIG. 3, a coupling pipe 39 is disposed between the communicating pipe 27 and the communicating pipe 28. A rotation shaft 40 is configured inside the coupling pipe 39 passing through the communicating pipe 27 and the communicating pipe 28. The exhaust valves 32 mounted to the respective communicating pipe 27 and communicating pipe 28 are mounted on the rotation shaft 40. That is, the two exhaust valves 32 are concentrically disposed and supported by the single rotation shaft 40, thus actuating the exhaust valves 32 at a synchronized timing. Although the detailed description of the rotation shaft 40 is omitted, a driven pulley 41 is mounted to one end side of the rotation shaft 40, the communicating pipe 27 side in this example. The wire 38 is coupled to the driven pulley 41 to rotatably drive the driven pulley 41 through a pulling operation of the wire 38. A return spring 42 is attached to the driven pulley 41. An elastic force by the return spring 42 biases the rotation shaft 40 to a close direction of the exhaust valves 32. To rotate the driven pulley 41, the wire 38 is pulled against the elastic force from the return spring 42.

Figure 5:
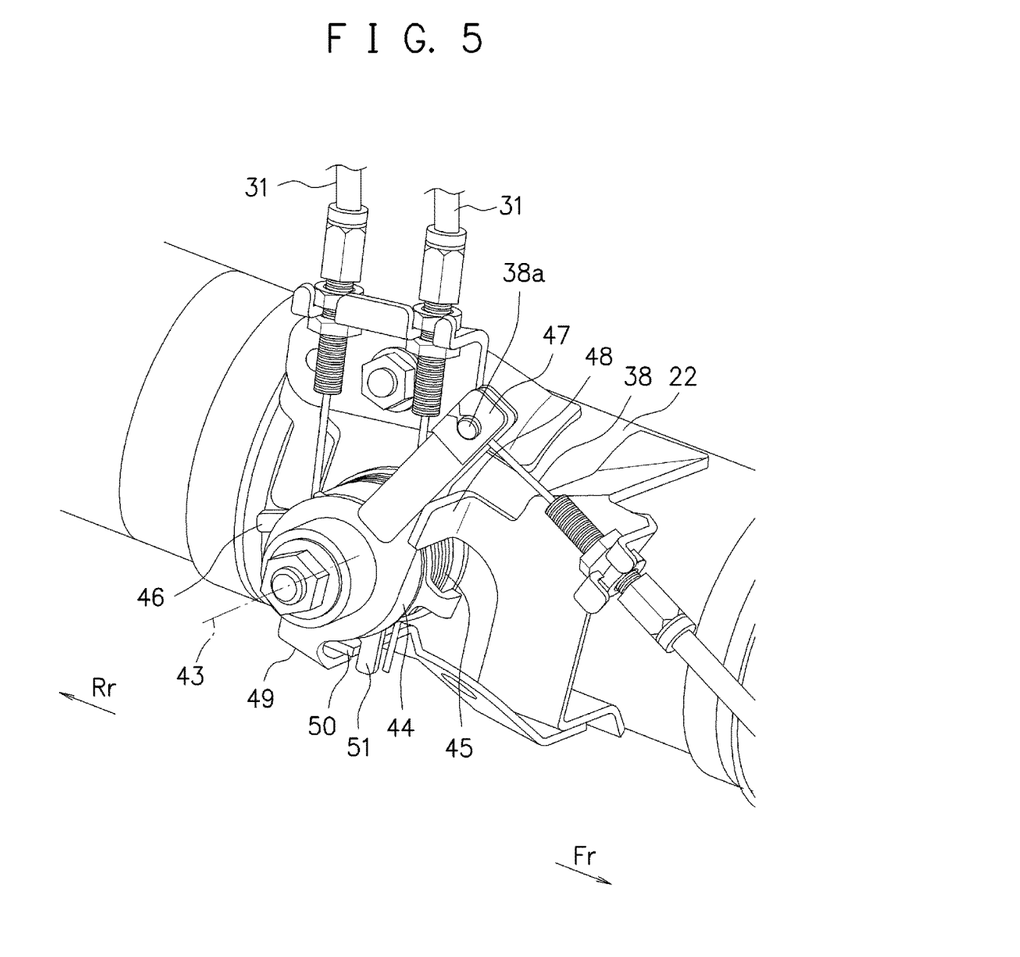
FIG. 5 is a perspective view illustrating an exemplary configuration of main parts of the exhaust control device according to the embodiment of the present invention.
Figure 6:
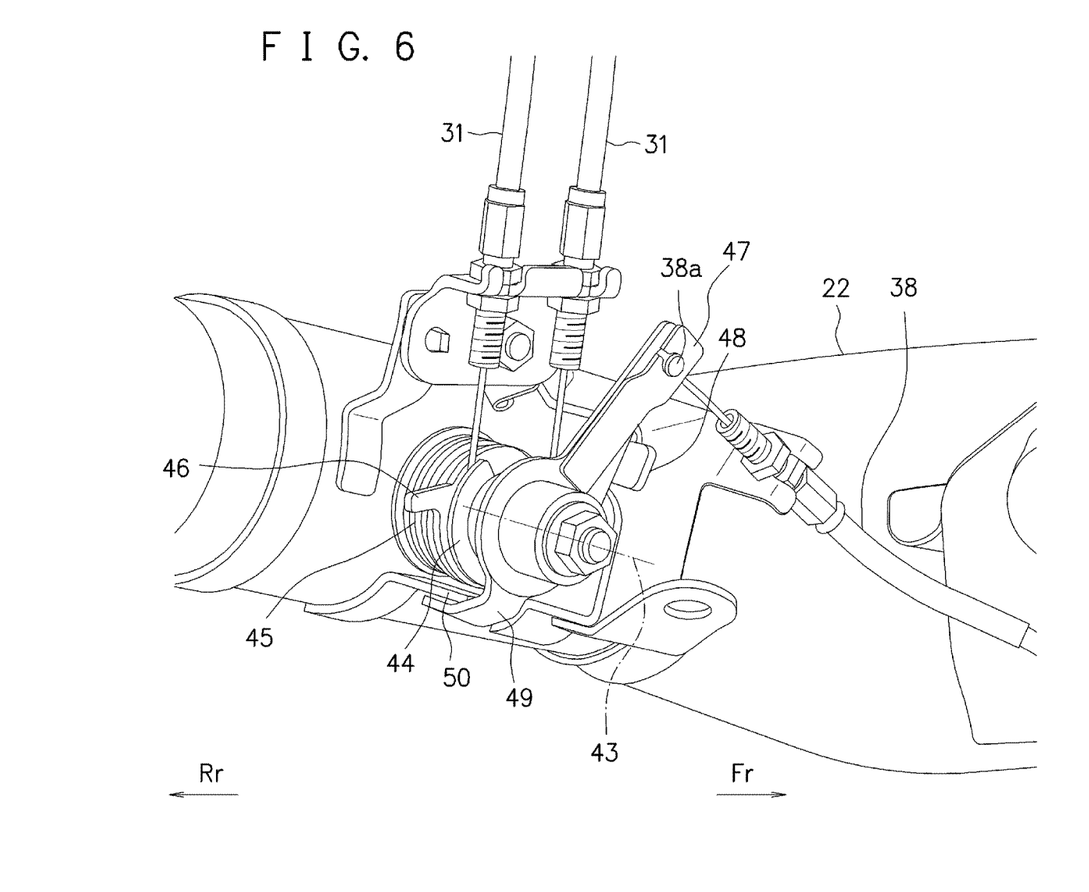
FIG. 6 is a perspective view illustrating an exemplary configuration of main parts of the exhaust control device according to the embodiment of the present invention.

The following describes the exhaust valve 33 side. As illustrated in FIG. 3, the exhaust valve 33, which is mounted to the collecting pipe 22, is mounted on a rotation shaft 43 configured to pass through the collecting pipe 22 and is rotatably supported around the rotation shaft 43. FIG. 5 and FIG. 6 are a front perspective view and a rear perspective view illustrating a surrounding of the arranged part of the exhaust valve 33. Although the detailed description of the rotation shaft 43 is omitted, a driven pulley 44 is mounted to one end side of the rotation shaft 43. The actuation of the actuator unit 29 rotatably drives the driven pulley 44. Other terminals 31b (see FIG. 7) of the wires 31 are held to locking holes (not illustrated) on the driven pulley 44. A return spring 45 is attached to the driven pulley 44. An elastic force by the return spring 45 biases the rotation shaft 43 to a close direction of the exhaust valve 33.

With the exhaust control device 26 of the present invention, especially the exhaust valves 32, the first exhaust valves, are driven to open and close corresponding to the actuating region of the exhaust valve 33, the second exhaust valve.

More specifically, as illustrated in FIG. 5 and FIG. 6, a second exhaust valve lever 46 and a first exhaust valve lever 47 are disposed coaxially with the rotation shaft 43 of the exhaust valve 33. The second exhaust valve lever 46 is actuated synchronously with the exhaust valve 33. The first exhaust valve lever 47 actuates the exhaust valves 32. The actuator unit 29 actuates the second exhaust valve lever 46 while the second exhaust valve lever 46 actuates the first exhaust valve lever 47.

The second exhaust valve lever 46 is formed integrally with the driven pulley 44 and extends radially outside the driven pulley 44. In this example, the second exhaust valve lever 46 extends rearward of the driven pulley 44 and both rotates integrally around the rotation shaft 43.

The first exhaust valve lever 47 is formed separately from the driven pulley 44 and is rotatively and axially supported to the rotation shaft 43. In this example, the first exhaust valve lever 47 extends forward of the driven pulley 44. The first exhaust valve lever 47 has a locking hole (not illustrated) at the distal end to hold one terminal 38a of the wire 38. On the basis of the elastic force from the return spring 42 (see FIG. 3), the first exhaust valve lever 47 is biased so as to circle to the right in FIG. 5 and FIG. 6 via the wire 38. In this case, a lock piece 48 projecting from the collecting pipe 22 is brought into abutment with the first exhaust valve lever 47, thus restricting the right-circling operation.

Figure 7:
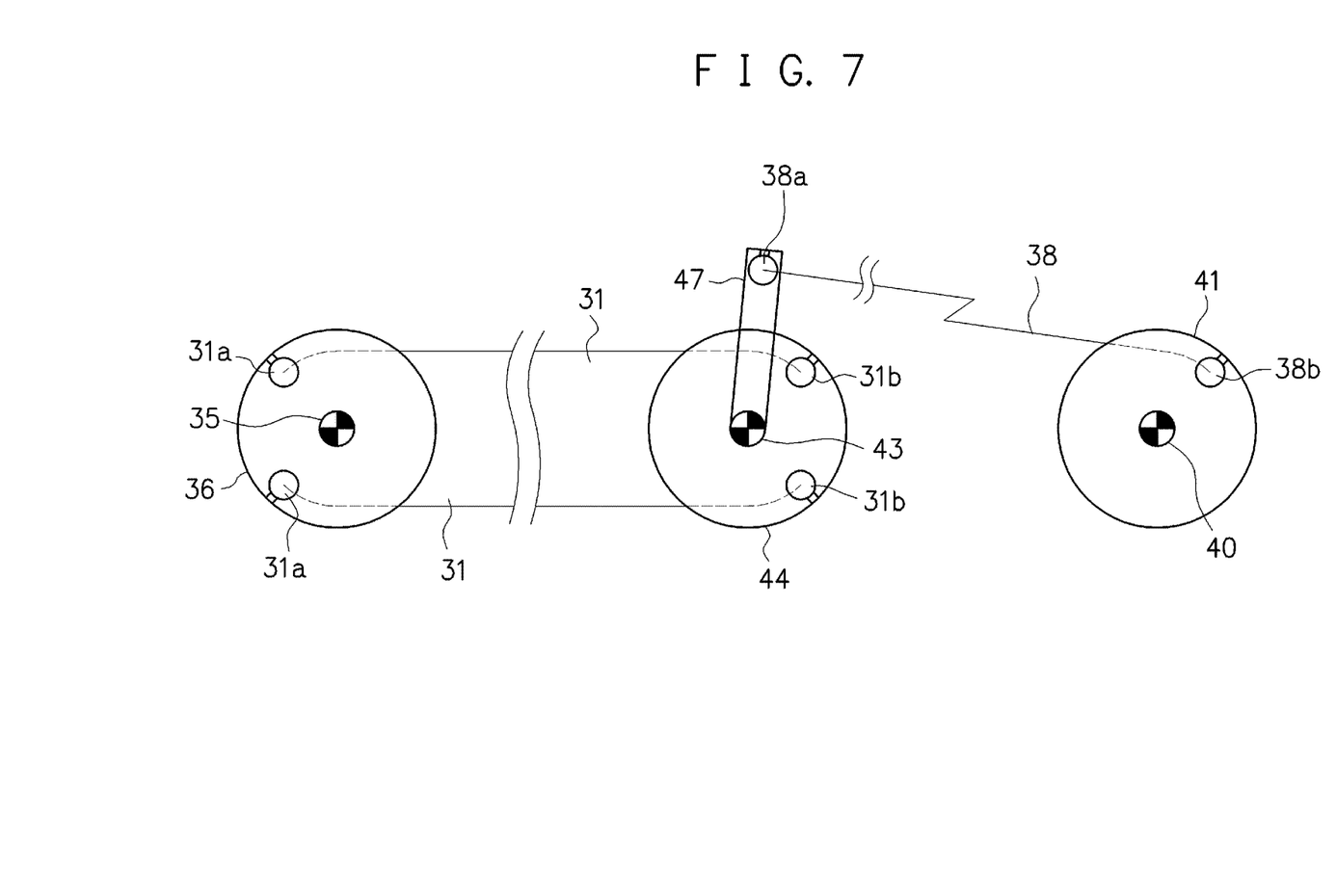
FIG. 7 is a schematic drawing illustrating a relationship of coupling a drive pulley and driven pulleys and the like in the exhaust control device according to the embodiment of the present invention.

FIG. 7 schematically illustrates a relationship of coupling the drive pulley 36 and the driven pulleys 41 and 44 and the like. As illustrated in the drawing, the drive pulley 36 is coupled to the driven pulley 44 via the wires 31. The first exhaust valve lever 47 is coupled to the driven pulley 41 via the wire 38. An other terminal 38b of the wire 38 is held to a locking hole (not illustrated) on the driven pulley 41.

Corresponding to the drive pulley 36 and the driven pulleys 41 and 44, the exhaust valves 32, the exhaust valve 33, and the actuator unit 29 are arranged sequentially from the front to the rear of the vehicle.

An engaging piece 49 projects on the opposite side from the first exhaust valve lever 47 across the rotation shaft 43. The engaging piece 49 is disposed as a part of this first exhaust valve lever 47 and is bent to ensure an abutment with the second exhaust valve lever 46. With the first exhaust valve lever 47 brought into abutment with the lock piece 48, this engaging piece 49 is disposed so as to be separate from the second exhaust valve lever 46 by a predetermined angle in a rotation direction of the driven pulley 44. The engaging piece 49 is rotatable together with the first exhaust valve lever 47 around the rotation shaft 43. Further, a stopper 50 projects from the collecting pipe 22 so as to be positioned on a rotational orbit of the second exhaust valve lever 46. After being brought into abutment with the second exhaust valve lever 46, the engaging piece 49 rotates around the rotation shaft 43 together with the first exhaust valve lever 47 by a predetermined angle in the rotation direction until the second exhaust valve lever 46 is brought into abutment with the stopper 50.

Opposite from the second exhaust valve lever 46, the driven pulley 44 integrally includes an engaging lever 51, which extends forward of the driven pulley 44. When this engaging lever 51 is brought into abutment with the stopper 50 as illustrated in FIG. 5, the engaging lever 51 restricts a right circle operation of the driven pulley 44 biased so as to circle to the right in FIG. 5 and FIG. 6 by an elastic force from the return spring 45.

Additionally, with reference to FIG. 3 regarding the driven pulley 41 as well, an engaging lever 52, which is integrally formed with the driven pulley 41, is brought into abutment with a stopper 53, which projects from the communicating pipe 27. When the engaging lever 52 is brought into abutment with the stopper 53, the rotation operation of the driven pulley 41 biased in a close direction of the exhaust valves 32 by the elastic force from the return spring 42 is restricted.

In the above-described case, the actuator unit 29, specifically the stepping motor 37, which is a driving source of the actuator unit 29, is coupled to a CPU (not illustrated) mounted to the vehicle. This CPU controls the stepping motor 37 in a relationship with the engine rotation speed or a similar specification.

Figure 8A:
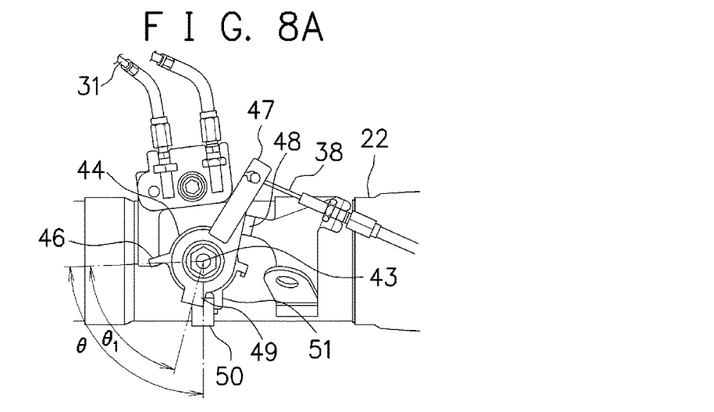
FIG. 8A illustrates an operation of the exhaust control device according to the embodiment of the present invention.
Figure 8B:
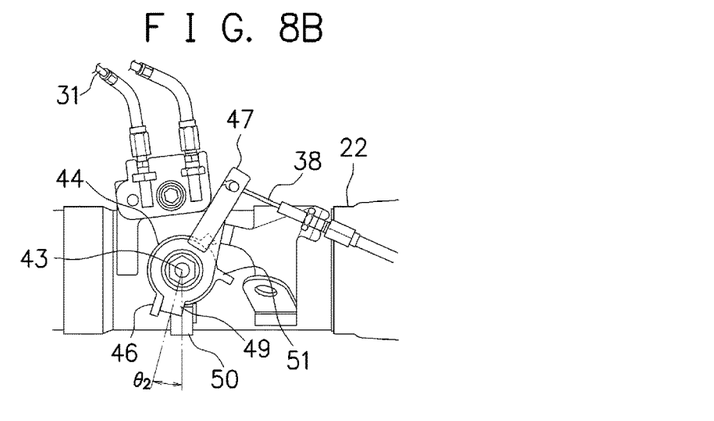
FIG. 8B illustrates an operation of the exhaust control device according to the embodiment of the present invention.
Figure 8C:
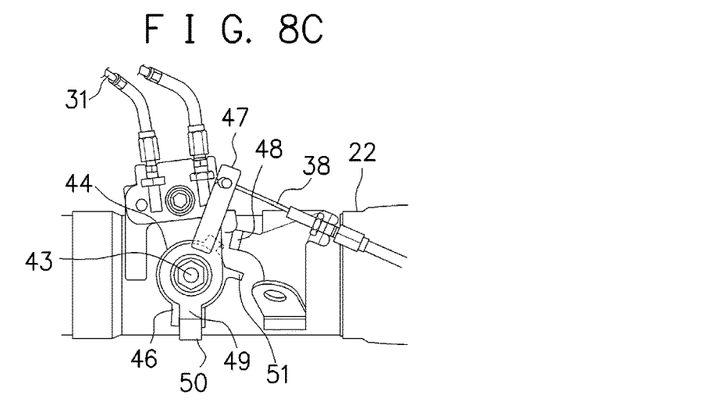
FIG. 8C illustrates an operation of the exhaust control device according to the embodiment of the present invention.
Figure 9:
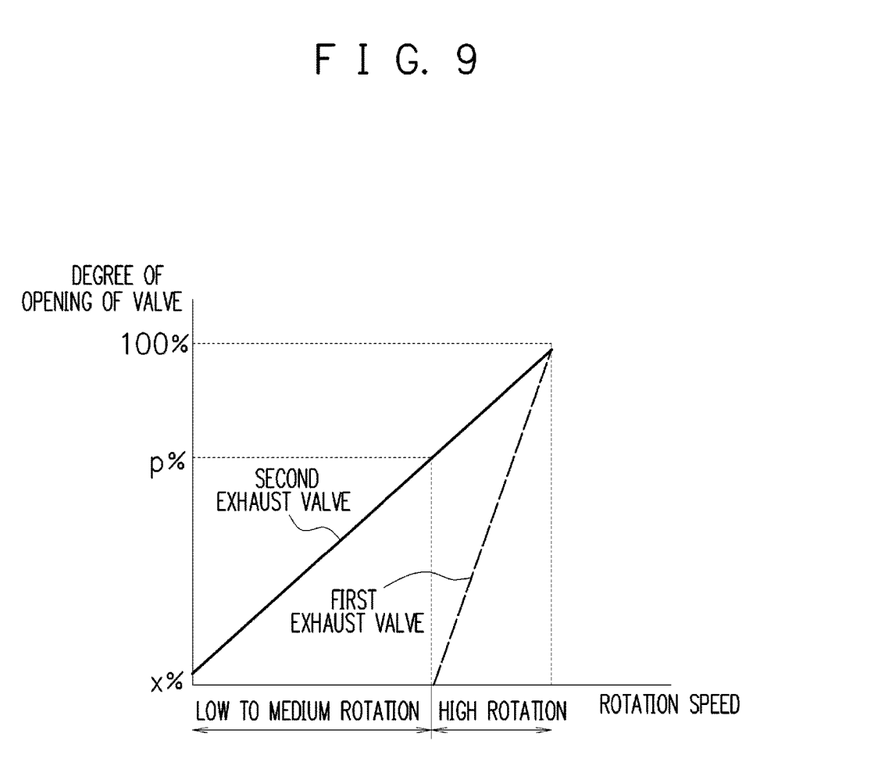
FIG. 9 illustrates a relationship between an engine rotation speed and degrees of opening of valves corresponding to an operation of the exhaust control device according to the embodiment of the present invention.

The exhaust control device for engine of the present invention is configured as described above. The following describes basic device operations and a similar item. FIG. 8A to FIG. 8C sequentially illustrate operations of the exhaust control device 26. FIG. 9 illustrates a relationship between the engine rotation speed and the degrees of opening of the valves corresponding to the operation of the exhaust control device 26.

As illustrated in FIG. 8A, at a start of the engine 10, the abutment of the engaging lever 51 with the stopper 50 specifies a rotation angle of the rotation shaft 43, that is, the degree of opening of the exhaust valve 33. In this example, the exhaust valve 33 is configured to be a comparatively small degree of opening, x %. At this time, the stopper 53 restricts the rotation of the driven pulley 41, thus setting and holding the exhaust valves 32 to be a fully-closed state, the degree of opening of 0%.

To increase the engine rotation speed, the stepping motor 37 of the actuator unit 29 is actuated and the drive pulley 36 rotates. This rotates the driven pulley 44 against the elastic force from the return spring 45 via the wires 31. This increases the degree of opening of the exhaust valve 33. In this example, the driven pulley 44 rotates by an angle $\theta_1$ from a low rotation to a medium rotation of the engine rotation speed. The exhaust valve 33 opens up to equal to or more than half degree of opening, being a degree of opening of p % (around 70 to 90%). As illustrated in FIG. 8B, the second exhaust valve lever 46, which rotates together with the driven pulley 44, is brought into abutment with the engaging piece 49. During this operation, the exhaust valves 32 are held to be the fully-closed state.

When the actuator unit 29 rotates the driven pulley 44 to further increase the engine rotation speed, the second exhaust valve lever 46 is brought into abutment with the engaging piece 49 in the rotation direction and pushes and moves the engaging piece 49. In view of this, the first exhaust valve lever 47 rotates the driven pulley 41 against the elastic force from the return spring 42 via the wire 38. Corresponding to this operation, the exhaust valves 32 start opening. In this example, with the engine rotation speed in the high rotation after the medium rotation, the exhaust valves 32 fully open, namely, 100%, from the full closing and the exhaust valve 33 also fully opens. The exhaust valves 32 are driven to open and close corresponding to a high rotation region among the actuating regions of the exhaust valve 33.

During the high rotation of the engine rotation speed, as illustrated in FIG. 8C, the second exhaust valve lever 46 further rotates by an angle $\theta_2$ until the second exhaust valve lever 46 is brought into abutment with the stopper 53. Accordingly, the engaging piece 49 rotates by the angle $\theta_2$ during this period. The first exhaust valve lever 47 also rotates by the angle $\theta_2$ similar to the engaging piece 49. The second exhaust valve lever 46 rotates by an angle $\theta$ from the start of actuation in FIG. 8A until the second exhaust valve lever 46 is brought into abutment with the stopper 50.

The following describes main operational advantages with the exhaust control device 26 of the present invention. First, following the second exhaust valve lever 46, which opens and closes the exhaust valve 33 mounted to the collecting pipe 22, the first exhaust valve lever 47 is actuated, that is, the driven pulley 41, which opens and closes the exhaust valves 32 via the wire 38, rotates. Accordingly, a mechanically significantly effective collaborative operation is performed. Thus, the efficient exhaust control operation is achieved.

The first exhaust valve lever 47 rotatively and axially supported to the rotation shaft 43. Therefore, for example, the terminal 38a on the wire 38 is once removed from the first exhaust valve lever 47, and a length of the wire 31 is adjustable in this state. Subsequent to this, the length of the wire 38 is adjusted, that is, these wires 31 and 38 can be independently adjusted. This allows securing and maintaining an operation free from a lash.

The actuator unit 29 includes the single drive pulley 36. This ensures downsizing these actuator unit 29 and drive pulley 36. Additionally, the entire actuator unit 29 can be compact, ensuring an improvement in a degree of freedom of layout.

The single actuator unit 29 can operate the opening and closing of the two exhaust valves 32 and the exhaust valve 33.

The single actuator unit 29 actuates the second exhaust valve lever 46 and the second exhaust valve lever 46 is brought into abutment with the first exhaust valve lever 47. Afterwards, the second exhaust valve lever 46 is brought into abutment with the stopper 50. Thus, starting from the actuation of the actuator unit 29, a sequence of operations are smoothly and efficiently performed.

During from the low rotation to the medium rotation of the engine, while the exhaust valves 32 are fully closed, the exhaust valve 33 opens from the predetermined degree of opening up to equal to or more than the half degree of opening. During the high rotation, the exhaust valves 32 open up to the full opening from the full closing and the exhaust valve 33 is also configured to open up to the full opening.

Thus actuating the exhaust valves 32 in conjunction with the exhaust valve 33 from the low rotation through the high rotation of the engine rotation speed ensures simplifying the configuration of the exhaust control device. Then, the actuating regions of the exhaust valves 32 and the exhaust valve 33 can be easily and properly configured.

The exhaust valves 32, the exhaust valve 33, and the actuator unit 29 are disposed sequentially from the front to the rear of the vehicle. This ensures routing the wires 31 and the wire 38, which couple the members, without intersection from one another. This also ensures improving assemblability of the plurality of components including the wires 31 and the wire 38.

Since the actuator unit 29 is installed in a predetermined manner inside the seat rails 107 at the lower side of the seat, the actuator unit 29 features excellent protectivity from outside. The actuator unit 29 is disposed at the position separated from the engine 10 rearward. Accordingly, the actuator unit 29 is free from an influence from the heat or a similar factor, thus a proper actuation is guaranteed.

As described above, the degree of opening of the exhaust valves 32 or the exhaust valve 33 is controlled according to the engine rotation speed. The opening and closing speeds to open and close these exhaust valves 32 and the exhaust valve 33 are equivalent to the inclination angles of the graph illustrated as example in FIG. 9 or a similar example. Note that, the drive control of the stepping motor 37 of the actuator unit 29 can appropriately adjust a slow speed. Opening and closing timings of these exhaust valves 32 and the exhaust valve 33 can also be configured as necessary. Including the case where the degree of opening linearly changes in the graph illustrated as example in FIG. 9 or a similar example, the degree of opening can be curved lines as a modified aspect of the embodiment.

While the present invention has been described using various embodiments above, the present invention is not limited only to these embodiments. Changes and similar modification are possible within the scope of the present invention.

Values such as the degree of opening of the exhaust valve 33, x % or p %, and the rotation angle $\theta_2$ or the angle $\theta_2$ described in the embodiment can be appropriately changed as necessary in a relationship with an output property of the engine 10 or a similar property.

With the present invention, following the second exhaust valve lever, which opens and closes the exhaust valve mounted to the collecting pipe, the first exhaust valve lever is actuated. Accordingly, a mechanically significantly effective collaborative operation is performed. Thus, the efficient exhaust control operation is achieved.

The single actuator performs the drive control on the at least two types of the exhaust valves, which perform the exhaust control on the different parts in the exhaust system. This ensures achieving downsizing of the device and a similar effect. Additionally, the entire actuator unit can be compact, ensuring an improvement in a degree of freedom of layout.

What is claimed is:

1. An exhaust control device for an engine configuring an exhaust system by joining exhaust pipes at a collecting pipe, the exhaust pipes being coupled to a plurality of respective cylinders, at least two types of exhaust valves being configured to perform an exhaust control at different parts in the exhaust system, the exhaust control device for the engine comprising:
   first exhaust valves mounted to a plurality of communicating pipes connecting predetermined exhaust pipes;
   a second exhaust valve mounted to the collecting pipe;
   an actuator configured to drive to open and close the second exhaust valve; and
   a first exhaust valve lever and a second exhaust valve lever disposed coaxially with the second exhaust valve, the second exhaust valve lever being configured to be actuated synchronously with the second exhaust valve, the first exhaust valve lever being configured to actuate the first exhaust valves,
   wherein the actuator is configured to actuate the second exhaust valve lever, and then the second exhaust valve lever is configured to actuate the first exhaust valve lever, and
   wherein the first exhaust valves are configured to be driven to open and close corresponding to a high rotation region of the second exhaust valve.

2. The exhaust control device for engine according to claim 1, wherein
   the second exhaust valve lever is brought into abutment with the first exhaust valve lever, afterwards the second exhaust valve lever is brought into abutment with a stopper disposes at the collecting pipe.

3. The exhaust control device for engine according to claim 1, wherein
   the first exhaust valve lever is rotatively and axially supported to a rotation shaft, the rotation shaft concentrically supporting the second exhaust valve lever.

4. The exhaust control device for engine according to claim 1, further comprising
   an engaging piece disposed as part of the first exhaust valve lever, the engaging piece ensuring an abutment with the second exhaust valve lever, wherein
   rotation of the second exhaust valve lever at a predetermined angle to be brought into abutment with the engaging piece so as to push and move the engaging piece actuates the first exhaust valve lever to rotate.

5. The exhaust control device for engine according to claim 1, wherein:
   from a low rotation to a medium rotation of the engine, the second exhaust valve opens from a predetermined degree of opening up to equal to or more than half degree of opening while the first exhaust valves are fully closed, and
   at a high rotation of the engine, the first exhaust valves is configured to open up to a full opening from a full closing and the second exhaust valve is also configured to open up to a full opening.

6. The exhaust control device for engine according to claim 1, wherein
   the first exhaust valves, the second exhaust valve, and the actuator are arranged sequentially from a front to a rear of a vehicle.

7. The exhaust control device for the engine according to claim 1,
   wherein the actuator is installed in a predetermined manner inside seat rails at a lower side of a seat.

* * * * *